United States Patent
Lee et al.

(10) Patent No.: US 12,126,045 B2
(45) Date of Patent: Oct. 22, 2024

(54) SEPARATOR FOR ELECTROCHEMICAL DEVICE, ELECTROCHEMICAL DEVICE COMPRISING THE SAME AND MANUFACTURING METHOD OF THE SEPARATOR

(71) Applicant: LG Chem, Ltd., Seoul (KR)

(72) Inventors: Joo-Sung Lee, Daejeon (KR); A-Young Lee, Daejeon (KR); Sun-Mi Jin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 546 days.

(21) Appl. No.: 16/633,376

(22) PCT Filed: Jun. 21, 2019

(86) PCT No.: PCT/KR2019/007549
§ 371 (c)(1),
(2) Date: Jan. 23, 2020

(87) PCT Pub. No.: WO2019/245343
PCT Pub. Date: Dec. 26, 2019

(65) Prior Publication Data
US 2021/0036286 A1    Feb. 4, 2021

(30) Foreign Application Priority Data

Jun. 22, 2018 (KR) .................. 10-2018-0072378

(51) Int. Cl.
| | | |
|---|---|---|
| H01M 50/446 | (2021.01) | |
| H01M 4/62 | (2006.01) | |
| H01M 50/403 | (2021.01) | |
| H01M 50/417 | (2021.01) | |
| H01M 50/42 | (2021.01) | |
| H01M 50/431 | (2021.01) | |
| H01M 50/451 | (2021.01) | |
| H01M 50/457 | (2021.01) | |
| H01M 50/46 | (2021.01) | |
| H01M 50/489 | (2021.01) | |

(52) U.S. Cl.
CPC ......... *H01M 50/446* (2021.01); *H01M 4/622* (2013.01); *H01M 50/403* (2021.01); *H01M 50/417* (2021.01); *H01M 50/42* (2021.01); *H01M 50/431* (2021.01); *H01M 50/451* (2021.01); *H01M 50/457* (2021.01); *H01M 50/46* (2021.01); *H01M 50/489* (2021.01)

(58) Field of Classification Search
CPC ............. H01M 50/451; H01M 50/457; H01M 50/443; H01M 50/446; H01M 50/449
See application file for complete search history.

(56) References Cited

U.S. PATENT DOCUMENTS

| | | | |
|---|---|---|---|
| 2010/0159314 A1 | 6/2010 | Kim et al. | |
| 2011/0003209 A1 | 1/2011 | Katayama et al. | |
| 2015/0056491 A1 | 2/2015 | Zhao et al. | |
| 2015/0171490 A1 | 6/2015 | Kim et al. | |
| 2016/0149184 A1* | 5/2016 | Nam ................... | H01M 50/431 |
| | | | 429/144 |
| 2016/0322620 A1* | 11/2016 | Kim .................... | H01M 50/449 |
| 2017/0162848 A1 | 6/2017 | Pan et al. | |
| 2017/0250400 A1 | 8/2017 | Ai et al. | |
| 2018/0277815 A1 | 9/2018 | Sung et al. | |
| 2019/0020008 A1 | 1/2019 | Kim et al. | |
| 2020/0014010 A1* | 1/2020 | Kwon ............... | H01M 10/0525 |

FOREIGN PATENT DOCUMENTS

| | | |
|---|---|---|
| CN | 101501895 A | 8/2009 |
| CN | 106861571 A | 6/2017 |
| JP | 2008210541 A | 9/2008 |
| JP | 2012155914 A | 8/2012 |
| JP | 2013149434 A | 8/2013 |
| JP | 2014180821 A | 9/2014 |
| JP | 2016152071 A | 8/2016 |
| JP | 2018048228 A | 3/2018 |
| JP | 6325180 B1 | 5/2018 |

(Continued)

OTHER PUBLICATIONS

"Aluminum Nitride, AlN Ceramic Properties." Aluminum Nitride | AlN Material Properties, 2013, accuratus.com/alumni.html. (Year: 2013).*
European Search Report for Application No. 19821533.7, dated Nov. 27, 2020, 9 pages.
International Search Report for Application No. PCT/KR2019/007549, mailed Sep. 20, 2019, pp. 1-2.
Search Report dated Nov. 19, 2021 from the Office Action for Chinese Application No. 201980003651.7 issued Nov. 29, 2021. 2 pgs.

*Primary Examiner* — Stephan J Essex
(74) *Attorney, Agent, or Firm* — Lerner David LLP

(57) ABSTRACT

Provided is a separator for an electrochemical device, including: a porous polymer substrate; and a porous organic/inorganic coating layer formed on at least one surface of the porous polymer substrate and including heat conductive inorganic particles and core-shell particles, wherein the particles are bound to one another by a binder polymer, and wherein the core-shell particle includes a core portion and a shell portion surrounding the surface of the core portion, the core portion includes a metal hydroxide having heat-absorbing property at 150-400° C., the shell portion includes a polymer resin, and the polymer resin is a water-insoluble polymer or crosslinked polymer. An electrochemical device including the separator is also provided. It is possible to provide a separator with an improved heat-absorbing effect and safety, and an electrochemical device including the same.

16 Claims, No Drawings

(56) References Cited

FOREIGN PATENT DOCUMENTS

| | | |
|---|---|---|
| KR | 20110002889 A | 1/2011 |
| KR | 20140037661 A | 3/2014 |
| KR | 20140112872 A | 9/2014 |
| KR | 20150040103 A | 4/2015 |
| KR | 20160065692 A | 6/2016 |
| KR | 20160130716 A | 11/2016 |
| KR | 20170007210 A | 1/2017 |
| KR | 20170062170 A | 6/2017 |
| KR | 20180003177 A | 1/2018 |
| KR | 20180063649 A | 6/2018 |
| TW | I539647 B | 6/2016 |
| WO | 2017010780 A1 | 1/2017 |
| WO | 2018038584 A1 | 3/2018 |

* cited by examiner

SEPARATOR FOR ELECTROCHEMICAL DEVICE, ELECTROCHEMICAL DEVICE COMPRISING THE SAME AND MANUFACTURING METHOD OF THE SEPARATOR

CROSS-REFERENCE TO RELATED APPLICATIONS

The present application is a national phase entry under 35 U.S.C. § 371 of International Application No. PCT/KR2019/007549, filed Jun. 21, 2019, which claims priority to Korean Patent Application No. 10-2018-0072378, filed Jun. 22, 2018, the disclosures of which are incorporated herein by reference.

TECHNICAL FIELD

The present disclosure relates to a separator for an electrochemical device, an electrochemical device including the same, and a method for manufacturing a separator. Particularly, the present disclosure relates to a separator for an electrochemical device having high heat conductivity and heat-absorbing function, an electrochemical device including the same, and a method for manufacturing a separator.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control fire and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problem of an electrochemical device, there has been suggested a separator including a porous organic/inorganic coating layer formed by coating a mixture of an excessive amount of inorganic particles with a binder polymer to at least one surface of a porous polymer substrate having a plurality of pores.

However, such a separator having a porous organic/inorganic coating layer has a limitation in absorption of heat generated when the temperature of a battery is increased rapidly. Particularly, a layer having a function of absorbing heat is required to control the local heat generated during a nail penetration safety test. However, the conventional separators have not recognized the above-mentioned problems.

Meanwhile, Korean Patent Laid-Open No. 10-2014-0037661 suggested a method for diffusing heat by using a heat conductive filler, but could not absorb the heat itself generated in a battery.

DISCLOSURE

Technical Problem

The present disclosure is directed to providing a separator for an electrochemical device having a heat-absorbing function.

The present disclosure is also directed to providing a separator an electrochemical device which has improved heat-absorbing function simultaneously with high heat conductivity.

In addition, the present disclosure is directed to providing an electrochemical device including the separator for an electrochemical device.

It will be easily understood that these and other objects and advantages of the present disclosure may be realized by the means shown in the appended claims and combinations thereof.

Technical Solution

In one aspect of the present disclosure, there is provided a separator for an electrochemical device according to any one of the following embodiments.

According to the first embodiment, there is provided a separator for an electrochemical device, including:

a porous polymer substrate; and a porous organic/inorganic coating layer formed on at least one surface of the porous polymer substrate, and including heat conductive inorganic particles and core-shell particles, wherein the particles are bound to one another by a binder polymer, and wherein the core-shell particle includes a core portion and a shell portion surrounding the surface of the core portion, the core portion includes a metal hydroxide having heat-absorbing property at 150-400° C., the shell portion includes a polymer resin, and the polymer resin is a water-insoluble polymer or crosslinked polymer.

According to the second embodiment, there is provided the separator for an electrochemical device as defined in the first embodiment, wherein the heat conductive inorganic particle has a heat conductivity of 20-350 W/m K.

According to the third embodiment, there is provided the separator for an electrochemical device as defined in the first or the second embodiment, wherein the heat conductive inorganic particle includes alumina, magnesium oxide, zinc oxide, aluminum nitride, boron nitride, or a mixture of two or more of them.

According to the fourth embodiment, there is provided the separator for an electrochemical device as defined in any one of the first to the third embodiments, wherein the core-shell particle has a diameter of 50-900 nm, and the shell portion has a thickness of 1-20 nm.

According to the fifth embodiment, there is provided the separator for an electrochemical device as defined in any one of the first to the fourth embodiments, wherein the metal hydroxide is a hydroxide including at least one element selected from the group consisting of aluminum, magnesium, silicon, zirconium, calcium, strontium, barium, antimony, tin, zinc and rare earth elements.

According to the sixth embodiment, there is provided the separator for an electrochemical device as defined in any one of the first to the fifth embodiments, wherein the water-insoluble polymer includes styrene butadiene rubber (SBR), acrylonitrile-butadiene rubber, acrylonitrile-butadiene-styrene rubber, acrylic copolymer, polyacrylonitrile, polyvinyl chloride, polyvinylidene fluoride, styrene, polycyanoacrylate, or a mixture of two or more of them.

According to the seventh embodiment, there is provided the separator for an electrochemical device as defined in any one of the first to the sixth embodiments, wherein the crosslinked polymer includes a carboxyl group, hydroxyl group, epoxy group, isocyanate group, methylol group, amine group, cyanoethyl group, or a mixture of two or more of them, as a functional group, in its backbone.

According to the eighth embodiment, there is provided the separator for an electrochemical device as defined in any one of the first to the seventh embodiments, wherein the core-shell particle includes the shell portion in an amount of 0.5-3 parts by weight based on 100 parts by weight of the core portion.

According to the ninth embodiment, there is provided the separator for an electrochemical device as defined in any one of the first to the eighth embodiments, wherein the core-shell particles are present in an amount of 30-90 parts by weight based on 100 parts by weight of the heat conductive inorganic particles.

According to the tenth embodiment, there is provided the separator for an electrochemical device as defined in any one of the first to the ninth embodiments, wherein the porous organic/inorganic coating layer further includes heat-absorbing organic particles.

According to the eleventh embodiment, there is provided the separator for an electrochemical device as defined in any one of the first to the tenth embodiments, wherein the heat-absorbing organic particle is a polymer having a melting point of 100-150° C.

According to the twelfth embodiment, there is provided the separator for an electrochemical device as defined in the tenth or the eleventh embodiment, wherein the heat-absorbing organic particle includes polyethylene, polypropylene, polyvinylidene fluoride, polyvinylidene fluoride copolymer, or a mixture of two or more of them.

According to the thirteenth embodiment, there is provided the separator for an electrochemical device as defined in any one of the tenth to the twelfth embodiments, wherein the heat-absorbing organic particles are present in an amount of 10-80 parts by weight based on 100 parts by weight of the heat conductive inorganic particles.

According to the fourteenth embodiment, there is provided the separator for an electrochemical device as defined in any one of the tenth to the thirteenth embodiments, wherein the organic/inorganic porous coating layer has a monolayer or multilayer structure.

According to the fifteenth embodiment, there is provided the separator for an electrochemical device as defined in the fourteenth embodiment, wherein the multilayer structure includes a first porous organic/inorganic coating layer including core-shell particles, and a second porous organic/inorganic coating layer formed on the surface of the first porous organic/inorganic coating layer and including heat-absorbing organic particles and heat conductive inorganic particles, or a first porous organic/inorganic coating layer including heat-absorbing organic particles and heat conductive inorganic particles, and a second porous organic/inorganic coating layer formed on the surface of the first porous organic/inorganic coating layer and including core-shell particles.

In another aspect of the present disclosure, there is also provided an electrochemical device according to the following embodiment.

According to the sixteenth embodiment, there is provided an electrochemical device including a cathode, an anode and a separator interposed between the cathode and the anode, wherein the separator is the separator for an electrochemical device as defined in any one of the first to the fifteenth embodiments.

In still another aspect of the present disclosure, there is provided a method for manufacturing a separator for an electrochemical device according to any one of the following embodiments.

According to the seventeenth embodiment, there is provided a method for manufacturing a separator for an electrochemical device, including the steps of:

preparing a porous polymer substrate; and forming a porous organic/inorganic coating layer on at least one surface of the porous polymer substrate, wherein the porous organic/inorganic coating layer includes heat conductive inorganic particles and core-shell particles, and the particles are bound to one another by a binder polymer, and wherein the core-shell particle includes a core portion and a shell portion surrounding the surface of the core portion, the core portion includes a metal hydroxide having heat-absorbing property at 150-400° C., the shell portion includes a polymer resin, and the polymer resin is a water-insoluble polymer or crosslinked polymer.

According to the eighteenth embodiment, there is provided the method for manufacturing a separator for an electrochemical device as defined in the seventeenth embodiment, wherein the step of coating a porous organic/inorganic coating layer includes a step of applying slurry containing core-shell particles, heat conductive inorganic particles, a binder polymer and a solvent to at least one surface of the porous polymer substrate, followed by drying.

According to the nineteenth embodiment, there is provided the method for manufacturing a separator for an electrochemical device as defined in the seventeenth or the eighteenth embodiment, wherein the step of coating a porous organic/inorganic coating layer includes the steps of:

applying slurry containing core-shell particles, a binder polymer and a solvent to at least one surface of the porous polymer substrate, followed by drying, to form a first porous organic/inorganic coating layer; and applying slurry containing heat conductive inorganic particles, a binder polymer and a solvent to the surface of the first porous organic/inorganic coating layer, followed by drying, to form a second porous organic/inorganic coating layer; or the steps of: applying slurry containing heat conductive inorganic particles, a binder polymer and a solvent to at least one surface of the porous polymer substrate, followed by drying, to form a first porous organic/inorganic coating layer; and applying slurry containing core-shell particles, a binder polymer and a solvent to the surface of the first porous organic/inorganic coating layer, followed by drying, to form a second porous organic/inorganic coating layer.

According to the twentieth embodiment, there is provided the method for manufacturing a separator for an electrochemical device as defined in the eighteenth embodiment, wherein the porous organic/inorganic coating layer further includes heat-absorbing organic particles.

According to the twenty-first embodiment, there is provided the method for manufacturing a separator for an electrochemical device as defined in the nineteenth embodiment, wherein each of the first organic/inorganic coating layer and the second porous organic/inorganic coating layer independently further includes heat-absorbing organic particles.

According to the twenty-second embodiment, there is provided the method for manufacturing a separator for an electrochemical device as defined in any one of the eighteenth to the twenty first embodiments, wherein the solvent includes any one of acetone, tetrahydrofuran, methylene chloride, chloroform, dimethyl formamide, N-methyl-2-pyrrolidone (NMP) and cyclohexane, or a mixture of two or more of them.

Advantageous Effects

According to an embodiment of the present disclosure, it is possible to provide a separator for an electrochemical device which includes heat conductive inorganic particles in the porous organic/inorganic coating layer, and thus can disperse the heat generated in a battery rapidly to improve safety.

According to an embodiment of the present disclosure, it is possible to provide a separator for an electrochemical device which includes a metal hydroxide having heat-absorbing property in the porous organic/inorganic coating layer, and thus absorbs the heat generated in a battery more rapidly to improve safety.

According to an embodiment of the present disclosure, the metal hydroxide is incorporated to the core portion of the core-shell particle and the surface of the core portion is surrounded with the shell portion including a polymer resin. Thus, it is possible to inhibit degradation of battery performance caused by the release of water from the metal hydroxide particles.

According to an embodiment of the present disclosure, it is possible to provide an electrochemical device which uses the separator and thus has improved safety.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure relates to a separator for an electrochemical device and an electrochemical device including the same.

In an electrochemical device, such as a lithium secondary battery, a separator including a porous polymer substrate alone undergoes a heat shrinking phenomenon at high temperature to cause a short-circuit between a cathode and an anode.

To prevent such heat shrinking, the conventional separators include a porous organic/inorganic coating layer containing inorganic particles and a binder polymer.

However, in the conventional porous organic/inorganic coating layer, the inorganic particles merely improve heat shrinking and function as resistance against external impact. Thus, when heat is generated in a battery rapidly, it is not possible to absorb the heat autonomously.

To reduce the heat generated in a battery autonomously, the separator for an electrochemical device according to an embodiment of the present disclosure is provided with a porous organic/inorganic coating layer including heat conductive inorganic particles and core-shell particles.

In one aspect of the present disclosure, there is provided a separator for an electrochemical device including a porous organic/inorganic coating layer on at least one surface of a porous polymer substrate, wherein the porous organic/inorganic coating layer includes core-shell particles.

According to an embodiment of the present disclosure, the core-shell particle includes a core portion and a shell portion surrounding the surface of the core portion.

According to an embodiment of the present disclosure, the core portion includes a metal hydroxide having heat-absorbing property at 150-400° C. Particularly, the metal hydroxide can absorb heat at 180-350° C., 190-300° C., or 200-250° C.

As used herein, 'metal hydroxide having heat-absorbing property at 150-400° C.' means a metal hydroxide causing endothermic reaction in the above-defined temperature range. Whether a metal hydroxide has heat-absorbing property or not in the above-defined temperature range may be analyzed through differential scanning calorimetry (DSC).

When the metal hydroxide undergoes endothermic reaction in the above-defined temperature range, it is possible to assemble and operate a battery normally and to improve the safety of a lithium secondary battery upon thermal runaway according to the endothermic reaction.

According to an embodiment of the present disclosure, the metal hydroxide may be a hydroxide including at least one element selected from the group consisting of aluminum, magnesium, silicon, zirconium, calcium, strontium, barium, antimony, tin, zinc and rare earth elements.

According to an embodiment of the present disclosure, the metal hydroxide may be aluminum hydroxide or magnesium hydroxide.

Aluminum hydroxide may be decomposed into alumina ($Al_2O_3$) and water ($H_2O$) by absorbing heat at a temperature of 200° C. or higher. Herein, it absorbs a heat energy of about 1000 J/g.

Magnesium hydroxide may be decomposed into magnesium oxide (MgO) and water ($H_2O$) by absorbing heat at a temperature of 350° C. or higher. Herein, it absorbs a heat energy of about 1300 J/g.

Therefore, since the metal hydroxide particles absorb the heat generated in an electrochemical device through endothermic reaction as soon as the heat is generated, it is possible to improve the safety of an electrochemical device more effectively.

According to an embodiment of the present disclosure, the core-shell particle includes a shell portion surrounding the surface of the core portion, wherein the shell portion includes a polymer resin.

As used herein, 'shell portion' means a portion completely surrounding the whole surface of the core portion so that any part of the surface of the core portion may not be exposed to the outside and any vacant space may not be formed.

According to an embodiment of the present disclosure, the polymer resin may be a water-insoluble polymer or crosslinked polymer.

As used herein, 'water-insoluble polymer' refers to a polymer which shows an insoluble content of 90 wt % or more when 0.5 g of the polymer is dissolved in 100 g of water at 25° C. When the surface of the core portion is surrounded completely with the water-insoluble polymer as mentioned above, it is possible to interrupt water fundamentally through the endothermic reaction of the metal hydroxide under a normal operating condition of a lithium secondary battery.

According to an embodiment of the present disclosure, the water-insoluble polymer may be styrene butadiene rubber (SBR), acrylonitrile-butadiene rubber, acrylonitrile-butadiene-styrene rubber, acrylic copolymer, polyacrylonitrile, polyvinyl chloride, polyvinylidene fluoride, styrene, polycyanoacrylate, or a mixture of two or more of them.

As used herein, 'crosslinked polymer' is used for linking the chains of the corresponding polymer to reduce swellability upon the impregnation with an electrolyte so that the electrolyte may be prevented from being in direct contact with the metal hydroxide. Non-limiting examples of the method for preparing such a crosslinked polymer include UV irradiation, thermal polymerization, initiator polymerization, or the like. In other words, the crosslinked polymer used herein is a polymer having low swellability with an electrolyte. Therefore, when the crosslinked polymer is used according to the present disclosure, it is possible to prevent the metal hydroxide from being in direct contact with an electrolyte, and thus to prevent generation of water caused by the endothermic reaction of the metal hydroxide.

According to the present disclosure, the crosslinked polymer is not particularly limited, as long as it has a functional group capable of crosslinking.

According to an embodiment of the present disclosure, the crosslinked polymer may include a carboxyl group, hydroxyl group, epoxy group, isocyanate group, methylol group, amine group, cyanoethyl group, or a mixture of two or more of them, as a functional group, in its backbone.

According to an embodiment of the present disclosure, the crosslinked polymer may be cyanoethylpolyvinyl alcohol.

According to an embodiment of the present disclosure, the diameter of the core-shell particles corresponds to the diameter of heat conductive inorganic particles, and the shell may have a thickness of 1-20 nm, 2-19 nm, or 3-18 nm. When the core-shell particles have such a diameter, it is possible to maintain dispersibility suitably, to ensure a densely packed structure in the porous organic/inorganic coating layer and a heat conduction path, and to prevent an increase in coating layer thickness and a decrease in battery energy density, caused by an excessively large diameter. In other words, according to an embodiment of the present disclosure, the core-shell particles and the heat conductive inorganic particles have the same or a similar diameter, and thus it is possible to make the structure in the porous organic/inorganic coating layer denser, thereby improving energy density and heat shrinkage.

According to an embodiment of the present disclosure, when the shell thickness is larger than the above-defined range, the porous organic/inorganic coating layer becomes excessively thick and interrupts heat conduction. When the shell thickness is smaller than the above-defined range, the metal hydroxide may be in contact with an electrolyte to cause side reactions.

As used herein, the diameter of core-shell particles means 'D50 diameter', and may be determined by the same method as the diameter of heat-absorbing organic particles.

According to an embodiment of the present disclosure, the core-shell particle may include 100 parts by weight of the core portion and 0.5-3 parts by weight, 0.8-2 parts by weight, or 0.9-1.5 parts by weight of the shell portion. When the content of shell portion is within the above-defined range, it is possible to solve the problem of reaction between water contained in the metal hydroxide in the core portion and an electrolyte at high temperature.

Herein, the weight ratio of the core portion to the shell portion in the core-shell particles may be calculated from the analysis using transmission electron microscopy (TEM). Particularly, it is possible to determine the diameter of core-shell particles and the thickness of the shell portion through TEM analysis, and to calculate the content of shell portion therefrom.

According to an embodiment of the present disclosure, the content of core-shell particles may be 30-90 parts by weight, 50-85 parts by weight, or 70-80 parts by weight based on 100 parts by weight of the heat conductive inorganic particles. When the content of core-shell particles is within the above-defined range, it is possible to improve heat shrinkage, to absorb the heat generated in an electrochemical device while conducting it at the same time, and thus to provide a separator with improved safety.

In the separator according to an embodiment of the present disclosure, the core-shell particles may be prepared by the following method, but are not limited thereto.

According to an embodiment of the present disclosure, a polar functional group is introduced to a polymer resin, first. The polar functional group is one having affinity to metal hydroxide particles and capable of adsorbing the metal hydroxide. The polymer resin having the polar functional group introduced thereto is dissolved in a suitable solvent, and then metal hydroxide particles are introduced thereto and dispersed through a bead mill. In this manner, it is possible to produce a core-shell structure including the polymer resin having adsorbability and adsorbed uniformly to the surface of the metal hydroxide particles.

According to an embodiment of the present disclosure, a water-insoluble polymer having a low glass transition temperature is prepared in the form of suspension, and is mixed with preliminarily dispersed metal hydroxide particles. Then, during a coating drying step, the water-insoluble polymer having a low glass transition temperature is allowed to coat and surround the surface of metal hydroxide particles, thereby providing a core-shell structure.

The separator according to an embodiment of the present disclosure includes a porous organic/inorganic coating layer on at least one surface of a porous polymer substrate, wherein the porous organic/inorganic coating layer includes heat conductive inorganic particles.

When core-shell particles are present alone in the porous organic/inorganic coating layer, although a heat-absorbing function is provided, heat transfer is made slowly due to low heat conductivity and any significant effect of improving safety of an electrochemical device cannot be provided. In addition, an effect of improving the safety of an electrochemical device may not be provided due to low resistance against metallic foreign materials.

According to the present disclosure, heat conductive inorganic particles having high heat conductivity is used in combination with the core-shell particles, and thus it is possible to absorb the heat generated in an electrochemical device autonomously and to disperse the absorbed heat rapidly, thereby providing a separator with improved safety.

According to an embodiment of the present disclosure, the heat conductive inorganic particles may have a heat conductivity of 20-350 W/m K, 25-300 W/m K, or 30-150 W/m K.

When the heat conductive inorganic particles have the above-defined heat conductivity range, it is possible to facilitate heat radiation upon internal heat emission, and thus to improve safety.

Herein, the heat conductivity may be determined by using a TCi instrument (C-Therm Co.).

According to an embodiment of the present disclosure, the heat conductive inorganic particle may be alumina, magnesium oxide, zinc oxide, aluminum nitride, boron nitride, or a mixture of two or more of them.

According to an embodiment of the present disclosure, the heat conductive inorganic particles may have a diameter of 50-900 nm, 80-700 nm, or 100-500 nm. When the heat conductive inorganic particles have such a diameter, it is possible to maintain dispersibility suitably, to ensure a densely packed structure in the porous organic/inorganic coating layer and a heat conduction path, and to prevent an increase in coating layer thickness and a decrease in battery energy density, caused by an excessively large diameter.

As used herein, the diameter of heat conductive inorganic particles means 'D50 diameter', and may be determined by the same method as the diameter of heat-absorbing organic particles.

The separator for an electrochemical device according to an embodiment of the present disclosure includes a porous organic/inorganic coating layer on at least one surface of a porous polymer substrate, wherein the porous organic/inorganic coating layer may further include heat-absorbing organic particles.

The heat-absorbing organic particles are capable of absorbing heat and are present in a particle state. Since the heat-absorbing organic particles are present in a particle state, it is possible to form pores in the porous organic/inorganic coating layer.

According to an embodiment of the present disclosure, the heat-absorbing organic particles may be a polymer having a melting point of 100-150° C. When the heat-absorbing organic particles have the above-defined melting point range, they cannot be molten and thus allow assemblage or normal operation of a lithium secondary battery. In other words, the heat-absorbing organic particles are not molten in a normal operating range of a lithium secondary battery. Therefore, the heat-absorbing organic particles do not affect the operation of a battery. In addition, in the above-defined temperature range, it is possible to ensure the safety of a lithium secondary battery from self-heating and thermal runaway of a conventional cathode active material merely by using the heat-absorbing organic particles.

According to an embodiment of the present disclosure, the heat-absorbing organic particles are not particularly limited, as long as they satisfy a melting point range of 100-150° C. Non-limiting examples of the heat-absorbing organic particles include polyethylene, polypropylene, polyvinylidene fluoride, polyvinylidene fluoride copolymer, or a mixture of two or more of them.

According to an embodiment of the present disclosure, the heat-absorbing organic particles may have a diameter of 50-800 nm, 100-700 nm, or 150-500 nm. When the heat-absorbing organic particles have such a diameter, it is possible to maintain dispersibility suitably, to provide the porous organic/inorganic coating layer itself with an adequate thickness, and thus to prevent the problem of a decrease in energy density of a lithium secondary battery, caused by an excessively large thickness of separator after coating.

As used herein, the diameter of heat-absorbing organic particles means 'D50 diameter' and refers to 50% accumulation diameter on the basis of volume. In general, the diameter may be determined by using light scattering, such as a laser diffraction process.

According to an embodiment of the present disclosure, the content of heat-absorbing organic particles may be 10-80, 20-70, or 30-60 parts by weight, based on 100 parts by weight of the heat conductive inorganic particles. When the content of heat-absorbing organic particles is within the above-defined range, it is possible to improve safety by absorbing the heat generated in an electrochemical device, and to provide a separator with resistance against metallic foreign materials by maintaining an adequate ratio of heat conductive inorganic particles.

According to an embodiment of the present disclosure, it is possible to provide a separator with more reinforced heat-absorbing function by further incorporating heat-absorbing organic particles into the porous organic/inorganic coating layer including the core-shell particles and heat conductive inorganic particles. In this case, it is possible to provide a separator with more improved safety. Particularly, it is advantageous in that safety can be maintained for a long time at high temperature.

According to an embodiment of the present disclosure, the porous organic/inorganic coating layer may have a monolayer or multilayer structure.

According to an embodiment of the present disclosure, when the porous organic/inorganic coating layer has a multilayer structure, heat conductive inorganic particles may be disposed intensively in a specific layer to increase the packing density of particles and to maximize the heat conductivity in the plane direction. Therefore, it is possible to maximize the ratio of heat conductive inorganic particles in the porous coating layer.

According to an embodiment of the present disclosure, the multilayer structure may include a first organic/inorganic coating layer including core-shell particles, and a second porous organic/inorganic coating layer formed on the surface of the first porous organic/inorganic coating layer and including heat-absorbing organic particles and heat conductive inorganic particles.

According to another embodiment of the present disclosure, the multilayer structure may include a first porous organic/inorganic coating layer including heat-absorbing organic particles and heat conductive inorganic particles, and a second porous organic/inorganic coating layer formed on the surface of the first porous organic/inorganic coating layer and including core-shell particles.

According to an embodiment of the present disclosure, in the case of a layer including heat conductive inorganic particles, the content of heat conductive inorganic particles may be 40 parts by weight or more, or 50 parts by weight or more, based on 100 parts by weight of the total porous organic/inorganic coating layer. Thus, it is possible to supplement the heat conductivity of the porous organic/inorganic coating layer.

According to an embodiment of the present disclosure, the separator may be one capable of absorbing heat at a temperature around the self-heating temperature of a cathode active material.

According to an embodiment of the present disclosure, the separator is one provided with a porous organic/inorganic coating layer capable of absorbing heat at 350° C. or lower.

As used herein. 'self-heating temperature' is the minimum temperature measured when a cathode active material used in a cathode starts exothermic reaction under a specific measurement condition.

The self-heating temperature may be determined by using differential scanning calorimetry (DSC). Particularly, the point, where a change in calorie of a cathode active material exposed to the surrounding condition including an increase in temperature (increase from 30° C. at a rate of 5° C./min) occurs, is defined as self-heating temperature.

According to an embodiment of the present disclosure, the separator may be one capable of absorbing heat at 350° C. or lower.

According to an embodiment of the present disclosure, the binder polymer may be one used currently for forming a porous organic/inorganic coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous organic/inorganic coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, tannic acid, or the like. Such binder polymers may be used alone or in combination.

According to an embodiment of the present disclosure, the ratio of the total weight of the heat conductive inorganic particles and core-shell particles to the weight of the binder polymer may be 50:50-99:1, or 65:35-99:1. When the weight ratio of the combined weight of the heat conductive inorganic particles and core-shell particles to the binder polymer satisfies the above-defined range, it is possible to solve the problem of a decrease in pore size and porosity of the resultant porous organic/inorganic coating layer caused by an increased content of the binder polymer and to solve the problem of degradation of peeling resistance of the resultant organic/inorganic coating layer caused by a decreased content of the binder polymer.

According to an embodiment of the present disclosure, when the organic/inorganic porous coating layer further includes heat-absorbing organic particles, the ratio of the total weight of the heat-absorbing organic particles, heat conductive inorganic particles and core-shell particles to the weight of the binder polymer may be 50:50-99:1, or 65:35-99:1. When the weight ratio of the combined weight of the heat-absorbing organic particles, heat conductive inorganic particles and core-shell particles to the binder polymer satisfies the above-defined range, it is possible to solve the problem of a decrease in pore size and porosity of the resultant porous organic/inorganic coating layer caused by an increased content of the binder polymer and to solve the problem of degradation of peeling resistance of the resultant organic/inorganic coating layer caused by a decreased content of the binder polymer.

According to an embodiment of the present disclosure, the separator may further include other additives as ingredients of the porous organic/inorganic coating layer, besides the microcapsules and binder polymer.

Although there is no particular limitation in thickness of the porous organic/inorganic coating layer, the porous organic/inorganic coating layer may have a thickness of 1-10 μm, particularly 1.5-6 μm. When the porous organic/inorganic coating layer is formed on both surfaces of the porous substrate, the total thickness of the porous organic/inorganic coating layers may be 2-20 μm, particularly 3-12 μm.

In addition, although there is no particular limitation in porosity of the porous organic/inorganic coating layer, the porous organic/inorganic coating layer preferably has a porosity of 35-65%.

In the separator according to an embodiment of the present disclosure, the porous polymer substrate may be a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene, alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the above-mentioned polymers, such as polyolefins and polyesters, alone or in combination.

In addition to the above-mentioned polyolefins, the porous polymer film substrate and the porous polymer non-woven web substrate may include polyethylene terephthalate, polybutylene terephthalate, polyester, polyacetal, polyamide, polycarbonate, polyimide, polyether ether ketone, polyether sulfone, polyphenylene oxide, polyphenylene sulfide, or the like, alone or in combination.

Although there is no particular limitation in thickness of the porous polymer substrate, the porous polymer substrate may have a thickness of 1-100 μm, particularly 5-50 μm. Although the pore size and porosity of the pores present in the porous polymer substrate are not also limited particularly, it is preferred that the pore size and porosity are 0.01-50 μm and 10-95%, respectively.

The separator according to an embodiment of the present disclosure may be manufactured by the following method.

First, a porous polymer substrate is prepared, and a porous organic/inorganic coating layer including heat conductive inorganic particles and core-shell particles is formed on at least one surface of the porous polymer substrate, wherein the particles are bound to one another by a binder polymer.

Herein, the core-shell particle includes a core portion and a shell portion surrounding the surface of the core portion, the core portion includes a metal hydroxide having heat-absorbing property at 150-400° C., the shell portion includes a polymer resin, and the polymer resin may be a water-insoluble polymer or crosslinked polymer.

According to an embodiment of the present disclosure, the step of coating a porous organic/inorganic coating layer may include applying slurry containing core-shell particles, heat conductive inorganic particles, a binder polymer and a solvent to at least one surface of the porous polymer substrate, followed by drying.

According to an embodiment of the present disclosure, the step of coating a porous organic/inorganic coating layer may include the steps of: applying slurry containing core-shell particles, a binder polymer and a solvent to at least one surface of the porous polymer substrate, followed by drying, to form a first porous organic/inorganic coating layer; and applying slurry containing heat conductive inorganic particles, a binder polymer and a solvent to the surface of the first porous organic/inorganic coating layer, followed by drying, to form a second porous organic/inorganic coating layer. According to another embodiment of the present disclosure, the step of coating a porous organic/inorganic coating layer may include the steps of: applying slurry containing heat conductive inorganic particles, a binder polymer and a solvent to at least one surface of the porous polymer substrate, followed by drying, to form a first porous organic/inorganic coating layer; and applying slurry containing core-shell particles, a binder polymer and a solvent to the surface of the first porous organic/inorganic coating layer, followed by drying, to form a second porous organic/inorganic coating layer.

According to an embodiment of the present disclosure, when the porous organic/inorganic coating layer has a multilayer structure, the heat conductive inorganic particles may be disposed intensively in a specific layer to increase the density of particles and to maximize the heat conductivity in the plane direction. In this manner, it is possible to maximize the ratio of heat conductive inorganic particles in the porous organic/inorganic coating layer.

According to an embodiment of the present disclosure, the porous organic/inorganic coating layer may be formed by applying slurry for forming a porous organic/inorganic coating layer including heat conductive inorganic particles and core-shell particles dispersed in a binder polymer dispersion containing a binder polymer dispersed in a solvent to a porous polymer substrate, followed by drying.

The method for applying a porous organic/inorganic coating layer may include a slot coating process or dip coating process, but is not limited thereto. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous polymer substrate coated with a composition for forming a porous organic/inorganic coating layer as mentioned above is dried by using a dryer, such as an oven, to form a porous organic/inorganic coating layer on at least one surface of the porous polymer substrate.

In the porous organic/inorganic coating layer, the heat conductive inorganic particles and core-shell particles are bound to one another by the binder polymer while they are packed and are in contact with each other. Thus, interstitial volumes are formed among the heat conductive inorganic particles and core-shell particles, and the interstitial volumes among the heat conductive inorganic particles and core-shell particles become vacant spaces to form pores.

In other words, the binder polymer attaches the heat conductive inorganic particles and core-shell particles to one another so that they may retain their binding states. For example, the binder polymer connects and fixes the heat conductive inorganic particles and core-shell particles with one another. In addition, the pores of the porous organic/inorganic coating layer are those formed by the interstitial volumes among heat conductive inorganic particles and core-shell particles which become vacant spaces. The spaces may be defined by the heat conductive inorganic particles and core-shell particles facing each other substantially in a closely packed or densely packed structure of the heat conductive inorganic particles and core-shell particles.

According to an embodiment of the present disclosure, the solvent may include any one of acetone, tetrahydrofuran, methylene chloride, chloroform, dimethyl formamide, N-methyl-2-pyrrolidone (NMP) and cyclohexane, or a mixture of two or more of them. In other words, in the separator according to an embodiment of the present disclosure, an organic solvent may be used for preparing slurry for forming a porous organic/inorganic coating layer. When an organic solvent is not used but a non-organic solvent, such as water, is used, metal hydroxide may have an increased water content during the preparation of a porous organic/inorganic coating layer, thereby adversely affecting the battery performance.

Meanwhile, in the method for manufacturing a separator according to an embodiment of the present disclosure, the porous organic/inorganic coating layer may further include heat-absorbing organic particles.

In the method for manufacturing a separator according to an embodiment of the present disclosure, each of the first porous organic/inorganic coating layer and the second porous organic/inorganic coating layer may further include heat-absorbing organic particles.

Herein, in the porous organic/inorganic coating layer, the heat-absorbing organic particles, heat conductive inorganic particles and core-shell particles are bound to one another by the binder polymer while they are packed and are in contact with one another. Thus, interstitial volumes are formed among the heat-absorbing organic particles, heat conductive inorganic particles and core-shell particles, and the interstitial volumes among the heat-absorbing particles, heat conductive inorganic particles and core-shell particles become vacant spaces to form pores.

In other words, the binder polymer attaches the heat-absorbing organic particles, heat conductive inorganic particles and core-shell particles to one another so that they may retain their binding states. For example, the binder polymer connects and fixes the heat-absorbing organic particles, heat conductive inorganic particles and core-shell particles with one another. In addition, the pores of the porous organic/inorganic coating layer are those formed by the interstitial volumes among the heat-absorbing organic particles, heat conductive inorganic particles and core-shell particles which become vacant spaces. The spaces may be defined by the heat-absorbing organic particles, heat conductive inorganic particles and core-shell particles facing each other substantially in a closely packed or densely packed structure of the heat-absorbing organic particles, heat conductive inorganic particles and core-shell particles.

According to an embodiment of the present disclosure, when forming slurry including core-shell particles containing a metal hydroxide in the preparation of slurry for forming a porous organic/inorganic coating layer, the solvent is limited only to an organic solvent so that the problem of adsorption of water to the metal hydroxide may be prevented. The test results related with this are described in Comparative Example 4.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite, artificial graphite, natural graphite or other carbonaceous materials are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Core-Shell Particles

First, 3 parts by weight of cyanoethyl polyvinyl alcohol as a crosslinked polymer resin was dissolved in 100 parts by weight of acetone, and 20 parts by weight of aluminum hydroxide $(Al(OH)_3)$ particles (D50, 0.5 μm) particles as metal hydroxide particles having heat-absorbing property was introduced thereto. Herein, heat-absorbing property of aluminum hydroxide was analyzed by differential scanning calorimetry (DSC). The weight ratio of the core portion and shell portion in the core-shell particles could be calculated by measuring the diameter of particles and the thickness of shell through transmission electron microscopy (TEM) analysis, wherein the shell portion was present in an amount of 2.48 parts by weight based on 100 parts by weight of the core portion. Then, agitation was carried out at room temperature for 12 hours through a bead mill process to obtain core-shell particles. When the resultant particles were observed through TEM, the shell portion had an average thickness of 8 nm, and the core-shell particles had an average diameter of 508 nm. Herein, acetone was used in an amount of 1,000 g.

(2) Manufacture of Separator

At room temperature, zinc oxide (LG Chem., average diameter (D50): 800 nm, heat conductivity: 50 W/m K at 25° C.) as heat conductive inorganic particles, the core-shell particles obtained from (1), and polyvinylidene-co-hexafluoropropylene (PVdF-HFP) (Solvay, Solef21510) as a binder polymer were dispersed in acetone as an organic solvent at a weight ratio of 45:35:20 to obtain slurry for forming a porous organic/inorganic coating layer. Herein, the heat conductive inorganic particles were added to the slurry in an amount of 100 g, which corresponded to 8 parts by weight based on 100 parts by weight of the organic solvent.

The slurry for forming a porous organic/inorganic coating layer was applied to both surfaces of a polyethylene porous substrate having a thickness of 9 µm by using a dip coating process to form porous organic/inorganic coating layers. Each of the porous organic/inorganic coating layers had a thickness of 4 µm.

(3) Manufacture of Cathode

A cathode active material ($Li(Ni_{0.8}Co_{0.1}Mn_{0.1})O_2$), a conductive material (carbon black) and a binder polymer (polyvinylidene fluoride) were introduced to N-methyl-2-pyrrolidone (NMP) at a weight ratio of 97:1.5:1.5, followed by mixing, to prepare slurry. The resultant slurry was coated onto aluminum foil having a thickness of 15 µm to a capacity of 5.1 mAh/cm$^2$ to obtain a cathode.

(4) Manufacture of Anode

A graphite-based anode active material (artificial graphite), a conductive material (carbon black), carboxymethyl cellulose (CMC) and a binder polymer (styrene butadiene rubber, SBR) were mixed with water at a weight ratio of 96:0.5:1.5:2 to prepare slurry. The resultant slurry was coated onto copper foil having a thickness of 8 µm to obtain an anode having a porosity of 24% and an NP balance of 105.

(5) Manufacture of Lithium Secondary Battery

First, $LiPF_6$ was dissolved in an organic solvent containing ethylene carbonate (EC) and ethylmethyl carbonate (EMC) mixed at a ratio of 3:7 (volume ratio) to a concentration of 1.0M to prepare a non-aqueous electrolyte.

Then, the separator was interposed between the cathode and the anode obtained as described above and pressing was carried out at 90° C. under 8.5 MPa for 1 second to form an electrode assembly. The electrode assembly was received in a pouch casing and the electrolyte was injected thereto to obtain a lithium secondary battery.

Example 2

First, core-shell particle slurry including 200 g of the core-shell particles obtained from Example 1 (1) dispersed in 1000 g of acetone as a solvent was prepared.

Next, the core-shell particle slurry was coated and dried on both surfaces of a polyethylene porous substrate having a thickness of 9 µm to form the first porous organic/inorganic coating layer (core-shell particle layer). Herein, the first porous organic/inorganic coating layer had a thickness of 2 µm.

Then, polyethylene particles (W400, Mitsui, melting point 121° C.) as heat-absorbing organic particles, zinc oxide (LG Chem., D50, 0.8 heat conductivity: 50 W/m K at 25° C.) as heat conductive inorganic particles, carboxymethyl cellulose (CMC, GL Chem, SG-L02) as a dispersing agent and acrylic copolymer (Toyo CSB130) as a binder polymer were dispersed in water as a solvent at a weight ratio of 30:68:1:1 to obtain slurry for forming the second organic/inorganic porous coating layer. Herein, the heat conductive inorganic particles were added to the slurry in an amount of 100 g, which corresponded to 20 parts by weight based on 100 parts by weight of the organic solvent.

The resultant slurry was further applied to the surface of the core-shell particle layer to a thickness of 2 followed by drying, to form the second porous organic/inorganic coating layer, thereby providing a finished separator. Herein, the second porous organic/inorganic coating layer had a thickness of 2 µm.

Therefore, the total thickness of the porous organic/inorganic coating layers including the first porous organic/inorganic coating layer and the second porous organic/inorganic coating layer was 4 µm on each of both surfaces of the polyethylene porous substrate in the same manner as Example 1. In addition, the resultant separator was used to obtain a secondary battery in the same manner as Example 1.

Example 3

A separator was obtained in the same manner as Example 2, except that the slurry containing the heat-absorbing organic particles and heat conductive inorganic particles was coated first onto the polyethylene porous substrate to form the first porous organic/inorganic coating layer, and then the second porous organic/inorganic coating layer containing the core-shell particles was formed on the first porous organic/inorganic coating layer, on the contrary to the porous organic/inorganic coating layer structure of Example 2. In addition, the resultant separator was used to obtain a secondary battery in the same manner as Example 1.

Comparative Example 1

A separator and a lithium secondary battery including the same were obtained in the same manner as Example 1, except that no shell portion was introduced to aluminum hydroxide and the solvent of slurry for forming a porous organic/inorganic coating layer was changed into N-methyl-2-pyrrolidone (NMP).

Comparative Example 2

According to Comparative Example 2, the first porous organic/inorganic coating layer includes core-shell particles and the second porous organic/inorganic coating layer includes heat-absorbing organic particles and a binder polymer. In other words, Comparative Example 2 includes no heat conductive inorganic particles.

Particularly, a separator and a lithium secondary battery including the same were obtained in the same manner as Example 2, except that the second porous organic/inorganic coating layer was formed by using the heat-absorbing organic particles and binder polymer at a weight ratio of 99:1, while the heat conductive inorganic particles and carboxymethyl cellulose as a dispersing agent were eliminated, when preparing slurry for forming the second organic/inorganic porous coating layer according to Example 2.

Comparative Example 3

A separator and a lithium secondary battery including the same were obtained in the same manner as Example 2, except that coating solution including the heat-absorbing organic particles, heat conductive inorganic particles, carboxymethyl cellulose as a dispersing agent and the binder polymer at a weight ratio of 3:95:1:1 without the core-shell particles was applied to a thickness of 4 µm. In other words, the same heat-absorbing organic particles, heat conductive inorganic particles and binder polymer as Example 2 were used.

Comparative Example 4

Based on 100 parts by weight of water, 0.4 parts by weight of carboxymethyl cellulose (CMC) as a dispersing agent was dissolved and 40 parts by weight of aluminum hydroxide (Al(OH)$_3$) particles (D50, 0.5 µm) were introduced. Then, agitation was carried out at room temperature for 12 hours through a bead mill process to obtain a water-dispersed coating solution. Herein, the aluminum hydroxide particles were introduced in an amount of 400 g.

The coating solution was applied onto the same polyethylene porous substrate as Example 1 to a thickness of 2 µm, and then a coating solution including heat-absorbing organic particles, heat conductive inorganic particles, CMC as a dispersing agent and binder polymer at a weight ratio of 48:50:1:1 was further introduced to obtain a separator and a lithium secondary battery including the same.

Meanwhile, carboxymethyl cellulose used herein has a fibrous structure like a skein. Thus, it could not form a shell portion surrounding the whole surface of aluminum hydroxide.

Test Examples

1) High-Temperature Storage Test of Lithium Secondary Battery

A lithium secondary battery was determined for its 0.2C discharge capacity at room temperature and fully charged, and then alternating current (AC) resistance at 1 kHz was determined and the battery was stored in an oven at 60° C. for 4 weeks. After the storage, the lithium secondary battery was cooled to room temperature and AC resistance at 1 kHz was determined again. Then, 0.2C discharge capacity was determined again under the same condition as the initial determination to identify an increase in resistance and a decrease in capacity after the storage at high temperature for 4 weeks. The results are shown in the following Table 1.

TABLE 1

|  | Increase in resistance (%) | Decrease in capacity (%) |
| --- | --- | --- |
| Example 1 | 20.5 | 15.8 |
| Example 2 | 16.9 | 9.8 |
| Example 3 | 23.6 | 18.3 |
| Comp. Ex. 1 | 45.3 | 25.9 |
| Comp. Ex. 2 | 16.1 | 9.5 |
| Comp. Ex. 3 | 15.6 | 9.1 |
| Comp. Ex. 4 | 53.9 | 28.4 |

As can be seen from the above results, Comparative Examples 1 and 4 including metal hydroxide particles having no shell portion introduced thereto show a high increase in resistance due to the side reactions under high temperature and high voltage, while providing a significantly decrease in battery capacity. It can be seen that when no shell portion is introduced, the lithium secondary battery shows significantly degraded performance.

2) Evaluation of Nail Penetration Safety of Lithium Secondary Battery

A lithium secondary battery was fully charged at room temperature and a nail penetration test was carried out under GB/T condition (nail diameter 5 mm, penetration rate 25 mm/sec). The following Table 2 shows whether a battery shows fire or not after the nail penetration and the maximum temperature when no fire occurs.

TABLE 2

|  | Fire after penetration | Maximum temperature after penetration (° C.) |
| --- | --- | --- |
| Example 1 | No fire | 41 |
| Example 2 | No fire | 35 |
| Example 3 | No fire | 32 |
| Comp. Ex. 1 | No fire | 40 |
| Comp. Ex. 2 | Fire | n/a |
| Comp. Ex. 3 | Fire | n/a |
| Comp. Ex. 4 | No fire | 34 |

In the case of Comparative Example 2 using no heat conductive inorganic particles or Comparative Example 3 using no core-shell particles, fire occurs after the nail penetration. Thus, it can be seen that the lithium secondary batteries show improved safety by virtue of the introduction of the corresponding coating layer. In other words, only the use of heat conductive inorganic particles and core-shell particles at the same time can provide a lithium secondary battery with improved safety.

3) High-Temperature Exposure Test of Lithium Secondary Battery (Hot Box Test)

A lithium secondary battery in its discharged state was charged at a charging rate of 0.1C at room temperature (23° C.) or low temperature (10° C.) so that it might be prepared in its fully charged state. In this hot box test, the fully charged battery was introduced to an oven capable of convection, warmed at a rate of 5° C./min., and exposed to 150° C. for 1 hour. Then, whether the battery caused fire or not was tested. The hot box test results are shown in the following Table 3.

TABLE 3

|  | Temperature during charge (° C.) | Fire in hot box test |
| --- | --- | --- |
| Example 1 | 23 | No fire |
|  | 10 | Fire |
| Example 2 | 23 | No fire |
|  | 10 | No fire |
| Example 3 | 23 | No fire |
|  | 10 | No fire |
| Comp. Ex. 1 | 23 | Fire |
|  | 10 | Fire |
| Comp. Ex. 2 | 23 | No fire |
|  | 10 | No fire |
| Comp. Ex. 3 | 23 | Fire |
|  | 10 | Fire |
| Comp. Ex. 4 | 23 | No fire |
|  | 10 | No fire |

In the case of Examples 2 and 3, no fire occurred in the batteries, even when they were charged at low temperature. It can be seen from the results that use of heat-absorbing organic particles can provide a lithium secondary battery with improved safety.

On the contrary, in the case of Comparative Example 1, the core-shell particles had no shell portion and no heat-absorbing organic particles were used. Thus, it was not possible to remove the heat generated in the battery and the battery failed in the hot box test. In the case of Comparative Example 3, no core-shell particles were used, and thus the battery failed both in the nail penetration safety test and in the hot box test.

What is claimed is:
1. A separator for an electrochemical device, comprising:
a porous polymer substrate; and
a porous organic/inorganic coating layer formed on at least one surface of the porous polymer substrate and comprising a heat conductive inorganic particle and a core-shell particle, wherein the particles are bound to one another by a binder polymer, and
wherein the core-shell particle comprises a core portion and a shell portion surrounding a surface of the core portion, the core portion comprises a metal hydroxide having heat-absorbing property at 150° C. to 400° C., wherein the shell portion is configured to prevent outflow of water caused by decomposing of the core portion into a metal oxide and water, and wherein the shell portion comprises a polymer resin, and the polymer resin is a water-insoluble polymer or crosslinked polymer,
wherein the crosslinked polymer comprises a carboxyl group, hydroxyl group, isocyanate group, methylol group, amine group, cyanoethyl group, or a mixture of two or more thereof, as a functional group, in its backbone,
wherein the heat conductive inorganic particle has a heat conductivity of 20 W/mK to 350 W/m·K,
wherein the porous organic/inorganic coating layer further comprises a heat-absorbing organic particle, and
wherein the organic/inorganic porous coating layer has a multilayer structure comprising:
a first porous organic/inorganic coating layer including the heat-absorbing organic particle and the heat conductive inorganic particle formed on a surface of the porous polymer substrate, and a second porous organic/inorganic coating layer formed on a surface of the first porous organic/inorganic coating layer and including the core-shell particle,
wherein the first porous organic/inorganic coating layer and the second porous organic/inorganic coating layer are not identical.

2. The separator according to claim 1, wherein the heat conductive inorganic particle comprises alumina, magnesium oxide, zinc oxide, aluminum nitride, boron nitride, or a mixture of two or more thereof.

3. The separator according to claim 1, wherein the core-shell particle has a diameter of 50 nm to 900 nm, and the shell portion has a thickness of 1 nm to 20 nm.

4. The separator according to claim 1, wherein the metal hydroxide is a hydroxide containing at least one element selected from the group consisting of aluminum, magnesium, silicon, zirconium, calcium, strontium, barium, antimony, tin, zinc and rare earth elements.

5. The separator according to claim 1, wherein the shell portion comprises the water-insoluble polymer comprises styrene butadiene rubber (SBR), acrylonitrile-butadiene rubber, acrylonitrile-butadiene-styrene rubber, acrylic copolymer, polyacrylonitrile, polyvinyl chloride, polyvinylidene fluoride, styrene, polycyanoacrylate, or a mixture of two or more thereof.

6. The separator according to claim 1, wherein the shell portion comprises the crosslinked polymer, and the crosslinked polymer comprises cyanoethylpolyvinylalcohol.

7. The separator according to claim 1, wherein the core-shell particle comprises the shell portion in an amount of 0.5 parts to 3 parts by weight based on 100 parts by weight of the core portion.

8. The separator according to claim 1, wherein the core-shell particle is present in an amount of 30 parts to 90 parts by weight of the heat conductive inorganic particle.

9. The separator according to claim 1, wherein the heat-absorbing organic particle is a polymer having a melting point of 100° C. to 150° C.

10. The separator according to claim 1, wherein the heat-absorbing organic particle comprises polyethylene, polypropylene, polyvinylidene fluoride, polyvinylidene fluoride copolymer, or a mixture of two or more thereof.

11. The separator according to claim 1, wherein the heat-absorbing organic particle is present in an amount of 10 parts to 80 parts by weight based on 100 parts by weight of the heat conductive inorganic particle.

12. An electrochemical device comprising a cathode, an anode and the separator as defined in claim 1.

13. A method for manufacturing a separator for an electrochemical device, comprising:
preparing a porous polymer substrate; and
forming a porous organic/inorganic coating layer on at least one surface of the porous polymer substrate, wherein the porous organic/inorganic coating layer comprises heat conductive inorganic particle and core-shell particle, and the heat conductive inorganic particle and the core-shell particle are bound to one another by a binder polymer, and
wherein the core-shell particle comprises a core portion and a shell portion surrounding the surface of the core portion, the core portion comprises a metal hydroxide having heat-absorbing property at 150° C. to 400° C., the shell portion comprises a polymer resin, and the polymer resin is a water-insoluble polymer or crosslinked polymer,
wherein the crosslinked polymer comprises a carboxyl group, hydroxyl group, isocyanate group, methylol group, amine group, cyanoethyl group, or a mixture of two or more thereof, as a functional group, in its backbone, and
wherein the porous organic/inorganic coating layer has a multilayer structure comprising:
a first porous organic/inorganic coating layer including the heat-absorbing organic particle and the heat conductive inorganic particle formed on a surface of the porous polymer substrate, and a second porous organic/inorganic coating layer formed on a surface of the first porous organic/inorganic coating layer and including the core-shell particle,
wherein the first porous organic/inorganic coating layer and the second porous organic/inorganic coating layers are not identical.

14. The method according to claim 13, wherein the forming the porous organic/inorganic coating layer comprises applying a slurry containing core-shell particle, heat conductive inorganic particle, a binder polymer and a solvent to at least one surface of the porous polymer substrate, followed by drying.

15. The method according to claim 13, wherein the forming the porous organic/inorganic coating layer comprises:
applying a slurry containing core-shell particle, a binder polymer and a solvent to at least one surface of the porous polymer substrate, followed by drying, to form a first porous organic/inorganic coating layer; and
applying a slurry containing heat conductive inorganic particle, a binder polymer and a solvent to a surface of the first porous organic/inorganic coating layer, followed by drying, to form a second porous organic/inorganic coating layer; or applying a slurry containing heat conductive inorganic particle, a binder polymer and the solvent to at least one surface of the porous polymer substrate, followed by drying, to form a first porous organic/inorganic coating layer; and applying a slurry containing core-shell particles, the binder polymer and the solvent to the surface of the first porous organic/inorganic coating layer, followed by drying, to form a second porous organic/inorganic coating layer.

16. The method according to claim 14, wherein the solvent comprises acetone, tetrahydrofuran, methylene chloride, chloroform, dimethyl formamide, N-methyl-2-pyrrolidone (NMP), cyclohexane, or a mixture of two or more thereof.

* * * * *